United States Patent
Souda et al.

(10) Patent No.: US 6,304,419 B1
(45) Date of Patent: Oct. 16, 2001

(54) MAGNETIC HEAD DEVICE AND RECORDING MEDIUM DRIVE

(75) Inventors: Yutaka Souda, Kanagawa; Hiraku Akiho, Miyagi; Wataru Ito, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/249,236

(22) Filed: Feb. 11, 1999

(30) Foreign Application Priority Data

Feb. 20, 1998 (JP) .................................................. 10-039190

(51) Int. Cl.⁷ ........................................................ G11B 5/48
(52) U.S. Cl. ...................................... 360/236.9; 360/99.01
(58) Field of Search .............................. 360/234.3, 234.7, 360/234.9, 235.4, 236.2, 236.9, 97.04, 99.01

(56) References Cited

U.S. PATENT DOCUMENTS

| | | | |
|---|---|---|---|
| 4,933,795 | * 6/1990 | Nigam ................................... | 360/121 |
| 5,235,483 | * 8/1993 | Hayakawa et al. ................... | 360/103 |
| 5,703,739 | * 12/1997 | Hayakawa et al. ................... | 360/121 |

FOREIGN PATENT DOCUMENTS

| | | |
|---|---|---|
| 2 255 221 | * 10/1992 | (GB) . |
| 2 279 800 | * 1/1995 | (GB) . |
| 2 279 801 | * 1/1995 | (GB) . |
| 3-059810 | * 3/1991 | (JP) . |
| 3-173914 | * 7/1991 | (JP) . |
| 3-181007 | * 8/1991 | (JP) . |
| 4-278206 | * 10/1992 | (JP) . |
| 4-291008 | * 10/1992 | (JP) . |
| 4-370564 | * 12/1992 | (JP) . |
| 5-143928 | * 6/1993 | (JP) . |
| 5-197919 | * 8/1993 | (JP) . |
| 9-212818 | * 8/1997 | (JP) . |
| 9-231537 | * 9/1997 | (JP) . |
| 11-149608 | * 6/1999 | (JP) . |

* cited by examiner

Primary Examiner—William Klimowicz
(74) Attorney, Agent, or Firm—Oblon, Spivak, McClelland, Maier & Neustadt, P.C.

(57) ABSTRACT

This invention relates to a magnetic head device and a disk drive, which are suitable for application to a mass-storage floppy disk drive or the like. A first and a second rail are provided on the disk side in projected form on a slider of each of magnetic head elements 20 so as to extend in a tangential direction R of a track of the disk and be parallel with each other. A head chip for recording and reproducing data in a state of being in contact with a recording surface of the disk and in a standard recording density is provided substantially in the central position of the first rail. Another head chip for recording and reproducing data in a state of being levitated from the recording surface of the disk and in a high recording density is provided in a position on the rear side of the second rail 26b with respect to the tangential direction R of the track. A width of the first rail of each magnetic head element is narrower than a width of the second rail thereof. The slider is inclined and levitated so that the second rail approaches the recording surface of the disk.

14 Claims, 16 Drawing Sheets

MAGNETIC HEAD DEVICE AND RECORDING MEDIUM DRIVE

BACKGROUND OF THE INVENTION

1. Field of the Invention

This invention relates to a magnetic head device and a recording medium drive, which are suitable for application to a mass-storage floppy disk drive or the like. Specifically, this invention relates to a magnetic head device or the like wherein first and second rails are formed on a slider, a head chip for a standard recording density is provided on the first rail, a head chip for a high recording density is provided on the second rail, and the width of the second rail is set narrower than that of the first rail, whereby low-order compatibility is provided, and the amount of levitation of the second rail is limited to improve a recording-reproducing characteristic of the head chip for the high recording density.

2. Description of the Related Art

For example, a floppy disk having a larger capacity of several tens of Mbytes to several hundreds of Mbytes as compared with the capacity of a conventional floppy disk has been proposed as a removable disk-shaped recording medium. In this case, an increase in the capacity of the floppy disk is achieved by the integration of various techniques such as a material used for a recording medium, a structure of a head chip, the processing of a signal for reproduction, the presence or absence of a tracking servo.

As one of the mass-storage floppy disk drive, the floppy disk drive of levitation type has been proposed, which increases the number of revolutions of a disk and performs recording/reproduction of data in such a way the magnetic head is slightly levitated from a recording surface of the disk.

The levitation-typed mass-storage floppy disk drive is one wherein the disk is rotated at a high speed and the resultant pressure based on airflow is used to levitate the magnetic head. A levitation system is a technique adopted in a hard disk drive. In practice, a slider with head chips incorporated therein is levitated.

The levitation-typed mass-storage floppy, disk drive, which has already been proposed, has a problem in that it has no compatibility or low-order compatibility with the already-existing floppy disk drive. Thus, a problem arises in that a disk drive for a mass-storage floppy disk cannot be incorporated in a personal computer under the circumstances where the current floppy disk is used.

It is therefore an object of the present invention to provide a magnetic head device or the like having low-order compatibility and capable of improving a recording-reproducing characteristic of a head chip for a high recording density.

SUMMARY OF THE INVENTION

According to a first aspect of the present invention, we provide a magnetic head device comprising a magnetic head element including a slider, first and second rails provided on the slider in form protruded to a recording medium side so as to extend in a tangential direction of a track of the recording medium and be parallel with each other, a first head chip for recording and reproducing data in a state of being kept in contact with a recording surface of the recording medium and in a first recording density, said first head chip being provided substantially in the central position of the first rail as viewed in the tangential direction of the track, and a second head chip for recording and reproducing data in a state of being levitated from the recording surface of the recording medium and in a second recording density greater than the first recording density, said second head chip being provided in a position on the rear side of the second rail with respect to the tangential direction of the track, wherein the width of the second rail of the magnetic head element is narrower than that of the first rail thereof.

In this aspect, when data are recorded on and reproduced from a recording medium at a first recording density, e.g., a standard recording density, the recording/reproduction is performed by a first head chip in a state in which it is in contact with the recording surface of the recording medium. On the other hand, when data is recorded on and reproduced from the recording medium at a second recording density, e.g., a high recording density, the recording/reproduction is performed by a second head chip in a state in which it is levitated from the recording surface of the recording medium. Thus, the recording/reproduction can be effected even on the recording medium for the standard recording density as well as on the recording medium for the high recording density, whereby low-order compatibility is obtained. Since the width of the second rail is narrower than that of the first rail, the amount of levitation of a second rail with respect to the recording medium is limited as compared with a first rail. Thus, recording-reproducing characteristics of the second head chip with respect to the recording medium having the high recording density can be improved. Since respective outer edges of the first and second rails are processed into tapered form, the edges of the rails make it possible to lessen the scratching of the recording surface of the recording medium upon soft landing and seek operation.

According to the second aspect of the present invention, we provide A magnetic head device comprising first and second head portions disposed in an opposing relationship so as to interpose a recording medium therebetween, a magnetic head element, which constitutes each of the first and second head portions, including a slider, first and second rails provided on the slider in form protruded to the recording medium side so as to extend in a tangential direction of a track of the recording medium and be parallel with each other, and a head chip for recording and reproducing data in a state of being levitated from a recording surface of the recording medium and in a predetermined density, said head chip being provided in a position on the rear side of the second rail with respect to the tangential direction of the track, wherein the width of the second rail is narrower than that of the first rail, and wherein the first and second rails of the magnetic head element constituting the first head portion are opposite to the second and first rails of the magnetic head element constituting the second head portion.

In this second aspect, data are recorded on and reproduced from one recording surface of a recording medium by a first head portion, whereas data are recorded on and reproduced from the other recording surface thereof by a second head. When, in this case, the data are recorded on and reproduced from the recording medium, for example, at a high recording density, the recording/reproduction is made by a head chip in a state in which it is levitated from a recording surface of the recording medium. The amount of levitation of a second rail with respect to the recording medium can be reduced as compared with a first rail by setting the width of the second rail narrower than that of the first rail. Further, since first and second rails of a magnetic head element constituting a first head portion are opposed to second and first rails of a magnetic head element constituting a second head portion, the recording medium is deformed or each magnetic head element is further inclined so that the second rails approach the recording surface of the recording medium at the opposed rail portions. Thereby, the amount of levitation of each second rail with respect to the recording medium is further restrained. Accordingly, it is possible to further improve a recording-reproducing characteristic of each head chip with respect to the recording medium for the high recording density, for example.

Incidentally, head chips for respectively recording and reproducing data in a state of being in contact with recording surfaces of a recording medium and in a density lower than the predetermined density may be respectively provided substantially in the central positions of the first rails of the first and second head portions. Thus, when data are recorded on and reproduced from a recording medium for a standard recording density, for example, the recording/reproduction can be made by the head chips provided on first rails in a state in which they are in contact with the recording surfaces of the recording medium, whereby low-order compatibility is obtained.

According to the third aspect of this invention, we provide a recording medium drive comprising the magnetic head device as described in the above first aspect, a record processing circuit for generating record data to be recorded on the recording medium by the magnetic head device, and a reproduction processing circuit for processing reproduction data reproduced from the recording medium by the magnetic head device.

Since the recording medium drive is provided with the above magnetic head device, it has low-order compatibility and makes it possible to limit the amount of levitation of each second rail with respect to the recording medium and thereby improve a recording-reproducing characteristic of a high recording density head chip.

According the forth aspect of this invention, we provide a recording medium drive comprising the magnetic head device as described in the above second aspect, a record processing circuit for generating record data to be recorded on a recording medium by the magnetic head device, and a reproduction processing circuit for processing reproduction data reproduced from the recording medium by the magnetic head device.

Since the recording medium drive is provided with the magnetic head device as described in the above forth aspect, it makes it possible to limit the amount of levitation of each second rail with respect to the recording medium and thereby improve a recording-reproducing characteristic of a head chip for a high recording density, for example.

A further understanding of the nature and advantages of the invention may be realized by reference to the following portions of the specification and drawings.

DESCRIPTION OF THE PREFERRED EMBODIMENTS

Figure 1:
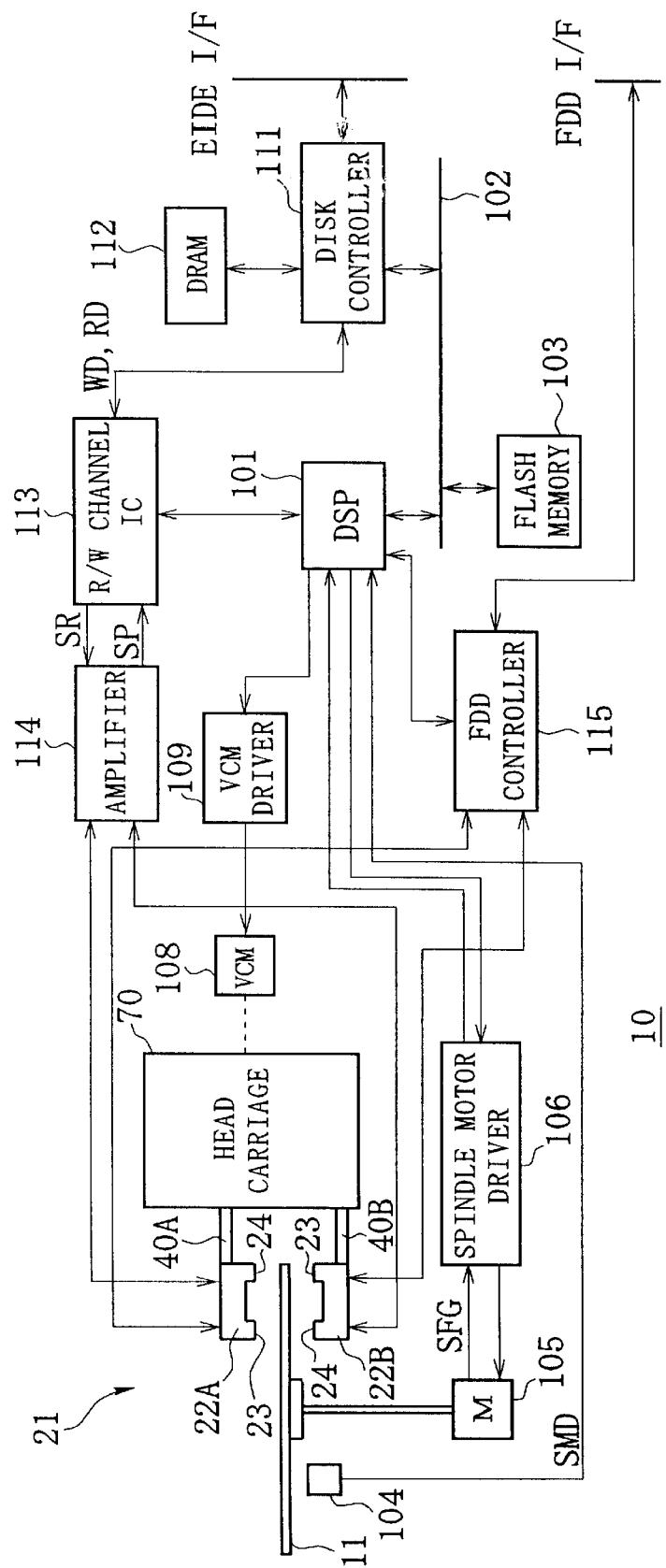
FIG. 1 is a block diagram showing a configuration of a floppy disk drive defined as an embodiment of the invention.
Figure 2A:
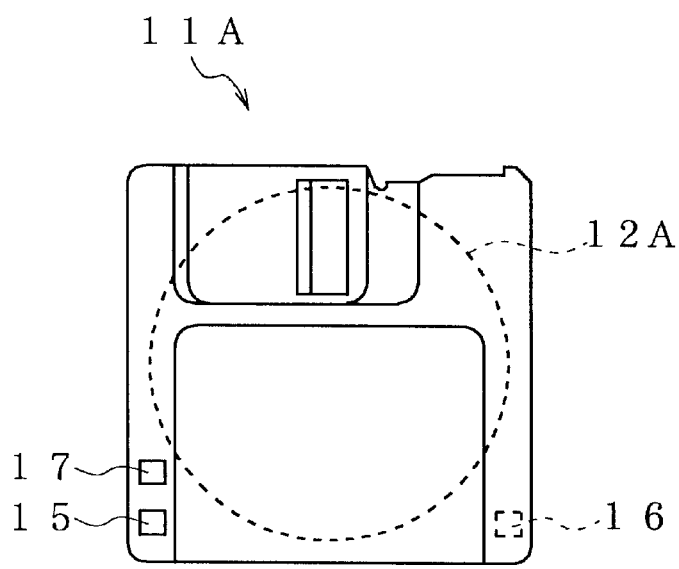
FIGS. 2A and 2B are views illustrating one example of each of a mass-storage floppy disk and a known floppy disk.
Figure 2B:
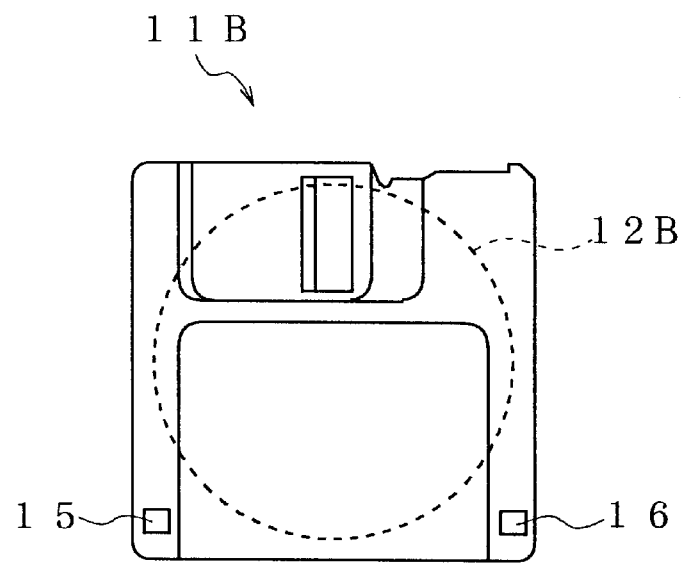

Preferred embodiments of this invention will hereinafter be described with reference to the accompanying drawings. FIG. 1 shows a floppy disk drive 10 defined as a preferred embodiment. As a floppy disk 11 usable in this drive 10, floppy disks 11A and 11B shown in FIGS. 2A and 2B are assumed. Namely, FIG. 2A shows the floppy disk 11A, which is compatible with the known floppy disks and contains therein a high recording-density (high-order mode) disk medium 12A having a large record capacity of several tens of Mbytes to a few hundreds of Mbytes or greater than those. FIG. 2B illustrates the known floppy disk 11B containing a standard recording-density (low-order mode) disk medium 12B having a record capacity of about two Mbytes, for example.

In FIGS. 2A and 2B, write protectors 15 respectively indicate a writable state of the disk when notches are closed and a write-protected state of the disk when they are open. HD holes 16 respectively indicate a so-called 2HD disk having a record capacity of about 2 Mbytes (upon unformatting) when the notches are open, and a disk other than above when the notches are closed. In FIG. 2A, the notch 17 defined in a predetermined position other than the above-described write protector 15 and HD hole 16 indicates the above-described mass-storage floppy disk having a record capacity of several tens of Mbytes to a few hundreds of Mbytes.

Referring back to FIG. 1, a magnetic head device 21 for magnetically performing the recording and reproduction of the data on the disk 11 comprises head portions 22A and 22B each placed in an opposing relationship so as to interpose the floppy disk 11 therebetween. The head portion 22A performs the recording/reproduction of the data on an upper recording surface of the floppy disk 11, whereas the head portion 22B performs the recording/reproduction of the data on a lower recording surface of the floppy disk 11. The head portions 22A and 22B respectively incorporate a head chip 23 for the standard recording density (low-order mode) with respect to the known floppy disk 11B and a head chip 24 for the high recording density (high-order mode) with respect to the mass-storage floppy disk 11A.

Figure 3A:
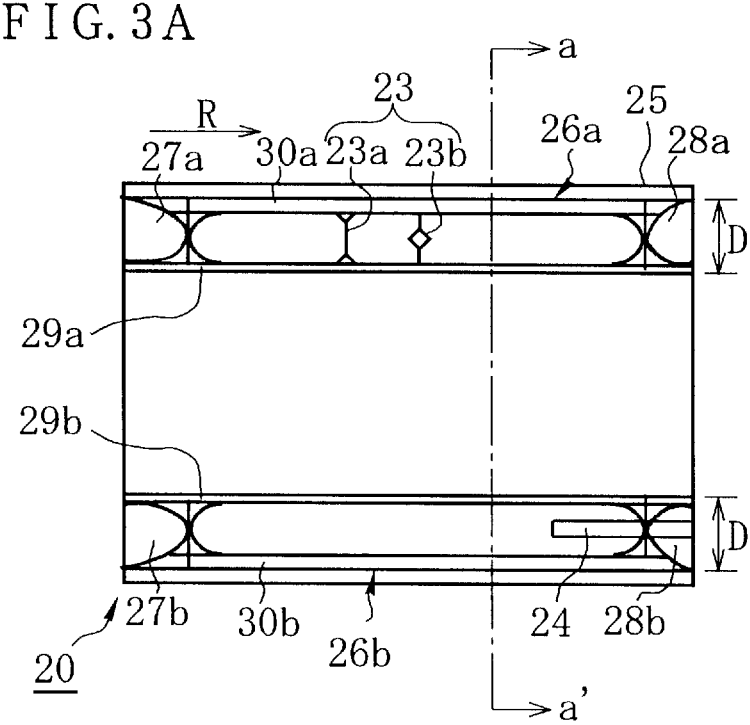
FIGS. 3A, 3B and 3C are respectively a view depicting a configuration of a magnetic head element.
Figure 3B:
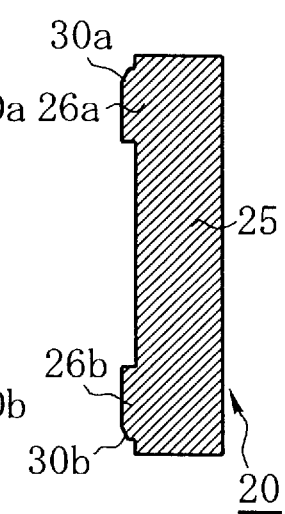
Figure 3C:
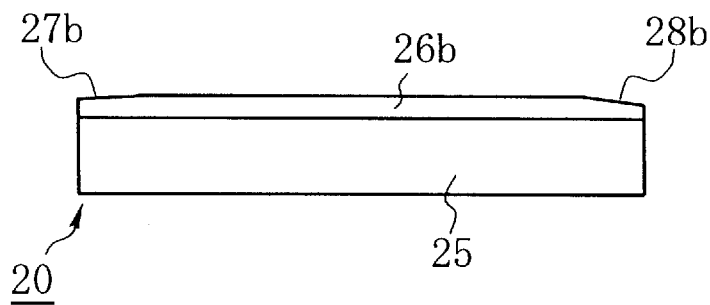

FIGS. 3A through 3C respectively show a configuration of a magnetic head element 20, which constitutes each of the head portions 22A and 22B as shown in FIG. 1. FIG. 3A is a bottom view of the magnetic head element 20 as viewed from the floppy disk 11 side. FIG. 3B is a view showing a sectional out side shape taken along line a–a' in FIG. 3A. FIG. 3C is a side view of the magnetic head element 20 as viewed from the lower side of FIG. 3A.

Two rails 26a and 26b are projected from the bottom of a slider 25 constituting the magnetic head element 20 so as to extend longitudinally in the same direction as the tangential direction R of a track (rotational direction of the disk) and be parallel with each other. The front and rear sides are defined with the tangential direction R of the track as the reference. Front tapers 27a and 27b are formed on the front sides of the rails 26a and 26b, and rear tapers 28a and 28b are formed on the rear sides thereof. For example, the angle formed between each of the front tapers 27a and 27b and the recording surface of the disk is defined as 1° and the angle formed between each of the rear tapers 28a and 28b and the recording surface of the disk is defined as 10° as shown in FIG. 4C.

In this case, a width Db of the rail 26b is formed so as to be narrower than a width Da of the rail 26a. Edges 29a and 29b provided inside the rails 26a and 26b respectively are blend-processed and edges 30a and 30b provided outside the rails 26a and 26b respectively are processed into tapered form. For example, the angle formed between each of the edges 30a and 30b and the recording surface of the disk is defined as 10° as shown in FIG. 4D. Incidentally, all edges that exist except for the edges 29a and 29b provided inside the rails 26a and 26b, are blend-processed. Further, their edges prevent the recording surface of the disk from being scratched.

The rail 26a incorporates the head chip 23 for the standard recording density (low-order mode). In the low-order mode, the disk medium in the floppy disk 11 rotates at a standard speed (e.g. 300 rpm). Under such a number of revolutions, the slider 25 does not levitate and thus the head chip 23 and the recording surface of the disk are brought into contact with each other to perform the recording/reproduction of data. Thus, a recording-reproducing head 23a and an erase head 23b of the head chip 23 are placed substantially in the central position as viewed in the tangential direction R of the track because their contact is the stablest in the central position.

Further, the rail 26b incorporates the head chip 24 for the high recording density (high-order mode) at the rear side with respect to the tangential direction R of the track. The head chip 24 has a structure capable of increasing a track recording density, e.g., a structure of a MIG (Metal In Gap) head. In the high-order mode, the disk medium in floppy disk 11 rotates at a high speed (e.g., 3600 rpm) although not mentioned above. Under the number of revolutions described above, airflow-based levitation pressure is produced so that the slider 25 is levitated.

Since the recording/reproduction of data is performed in a state in which the disk medium in the floppy disk 11 rotates at the high speed and thus the slider 25 is being levitated, the amount of levitation of the slider 25 is adjusted so that the interval between the recording surface of the disk and a gap of the head chip 24 reaches a predetermined value (e.g., 50 nm). Assuming that the relative peripheral velocity of the disk medium in the floppy disk 11 is constant, the amount of levitation of the slider 25 is defined according to the widths of the rails 26a and 26b and the like. In order to reduce the amount of levitation of the rail 26b and bring the interval between the recording surface of the disk and the gap of the head chip 24 to the predetermined value, the width Db of the rail 26b is formed so as to be narrower than the width Da of the rail 26a as described above. Thus, when the slider 25 is in the levitated state, it is brought to an inclined state so that the rail 26b rather than the rail 26a approaches the recording surface of the disk.

Figure 4A:
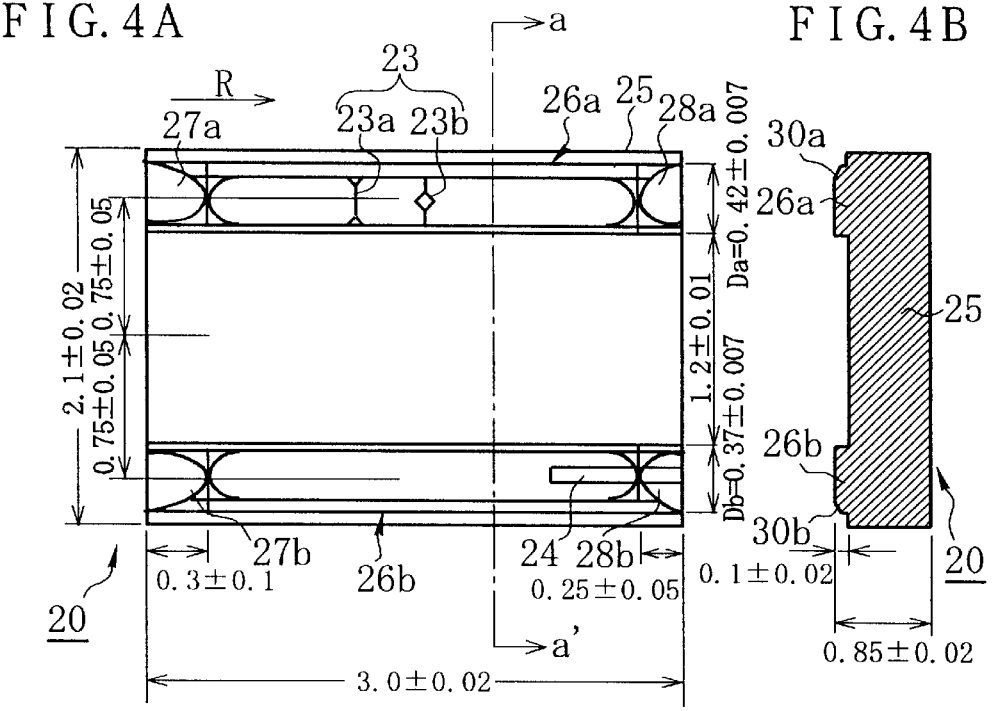
FIGS. 4A, 4B, 4C and 4D are respectively a view showing one example illustrative of dimensions or the like of respective portions of the magnetic head element.
Figure 4B:
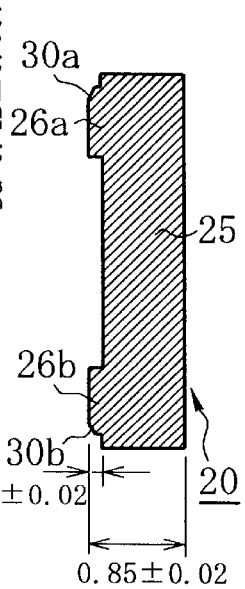
Figure 4C:
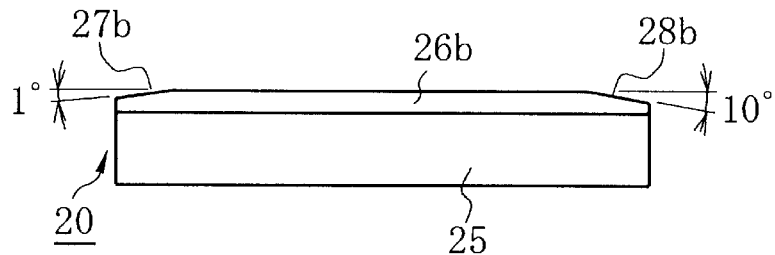
Figure 4D:
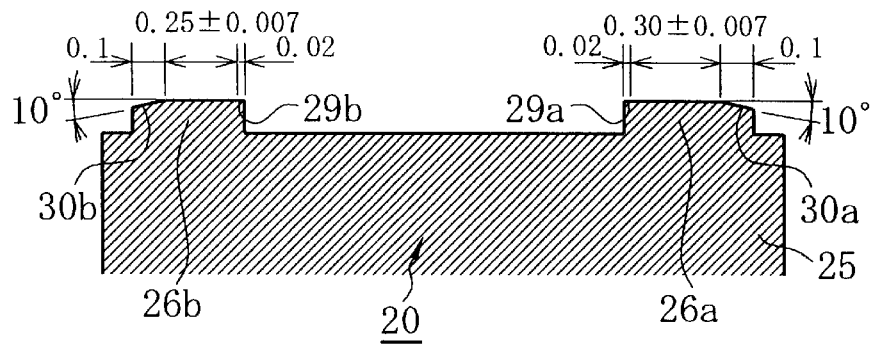

FIGS. 4A through 4D show one example of the magnetic head element 20 (where load pressure is 7 g) wherein the dimensions or the like of the respective portions thereof are illustrated. FIGS. 4A through 4C correspond to FIGS. 3A through 3C respectively. FIG. 4D illustrates an essential part of FIG. 4B in an enlarged form. Incidentally, the unit of the dimensions is represented as [mm] In the present example, the width Da of the rail 26a is set to 0.42±0.007 [mm] and the width Db of the rail 25b is set to 0.37±0.007 [mm]. A surface of the slider, which is opposite to the disk, is a rectangle having a length of 3.0±0.02 [mm] and a width of 2.1±0.02 [mm].

The upper and lower head portions 22A and 22B are disposed in an opposing relationship so as to interpose the floppy disk 11 therebetween as described above. In this case, the rails 26a and 26b of the magnetic head element 20 constituting the head portion 22A, are respectively disposed so as to be opposite to the rails 26b and 26a of the magnetic head element 20 constituting the head portion 22B as shown in FIG. 5.

Figure 5:
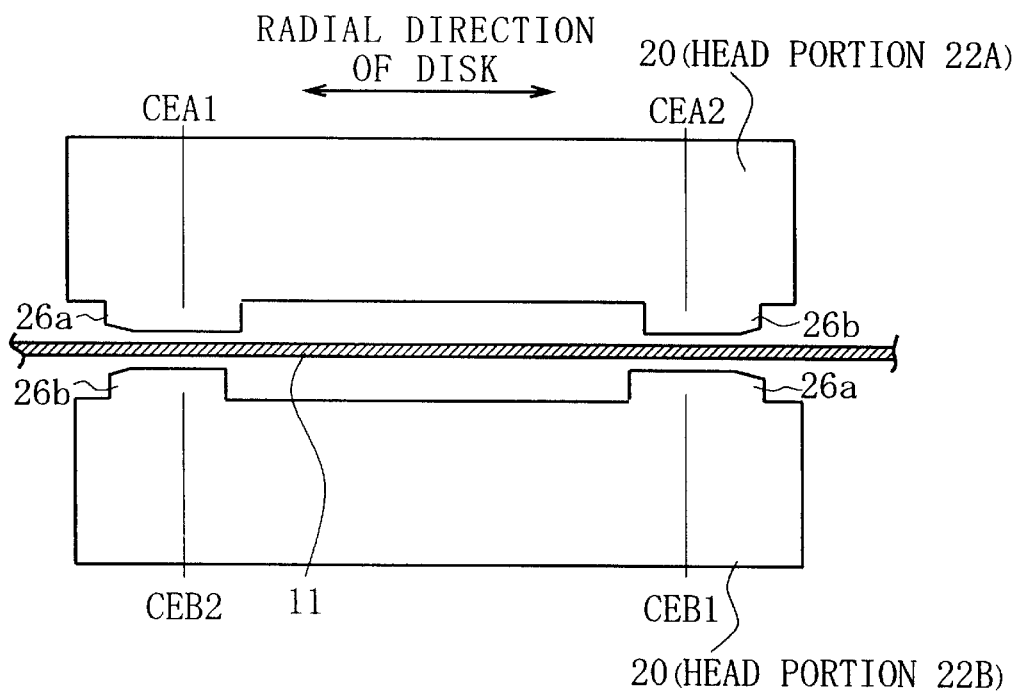
FIG. 5 is a view illustrating the relationship of placement of upper and lower magnetic head elements.

Further, as shown in FIG. 5, centers CEA1 and CEA2 of the widths, as viewed from a radial direction of the disk, of the head chips 23 and 24 (not shown in FIG. 5 and see FIG. 3A) respectively attached to the rails 26a and 26b of the magnetic head element 20 constituting the head portion 22A are respectively placed so as to coincide with centers CEB2 and CEB1 of the widths, as viewed from a radial direction of the disk, of the head chips 24 and 23 (not shown in FIG. 5 and see FIG. 3A) attached to the rails 26b and 26a of the magnetic head element 20 constituting the head portion 22B. In this case, centers of the widths of the rails 26a and 26b, as viewed from a radial direction of the recording medium, of the magnetic head element 20 constituting the head portion 22A, except for edges 30a and 30b located outside the rails 26a and 26b, respectively substantially coincide with centers of the widths, as viewed from a radial direction of the recording medium, of the rails 26b and 26a of the magnetic head element 20 constituting the head portion 22B, except for edges 30b and 30a located outside the rails 26b and 26a.

Figure 6:
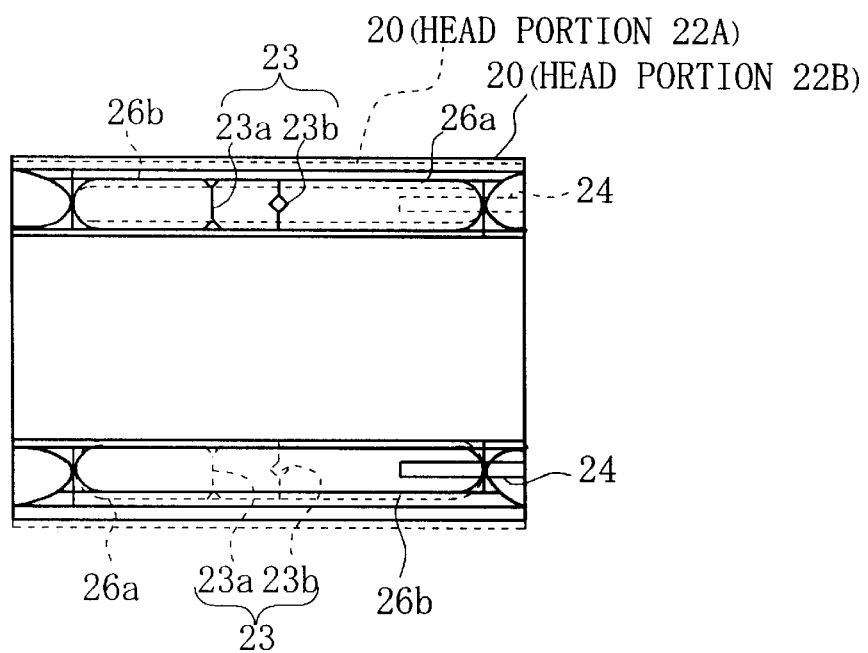
FIG. 6 is a view depicting the state where the upper and lower magnetic head elements overlap.

FIG. 6 shows the state where the head portions 22A and 22B overlap. In the FIG. 6, a solid line indicates the magnetic head element 20 that constitutes the head portion 22B, whereas a broken line indicates the magnetic head element 20 that constitutes the head portion 22A.

Figure 7:
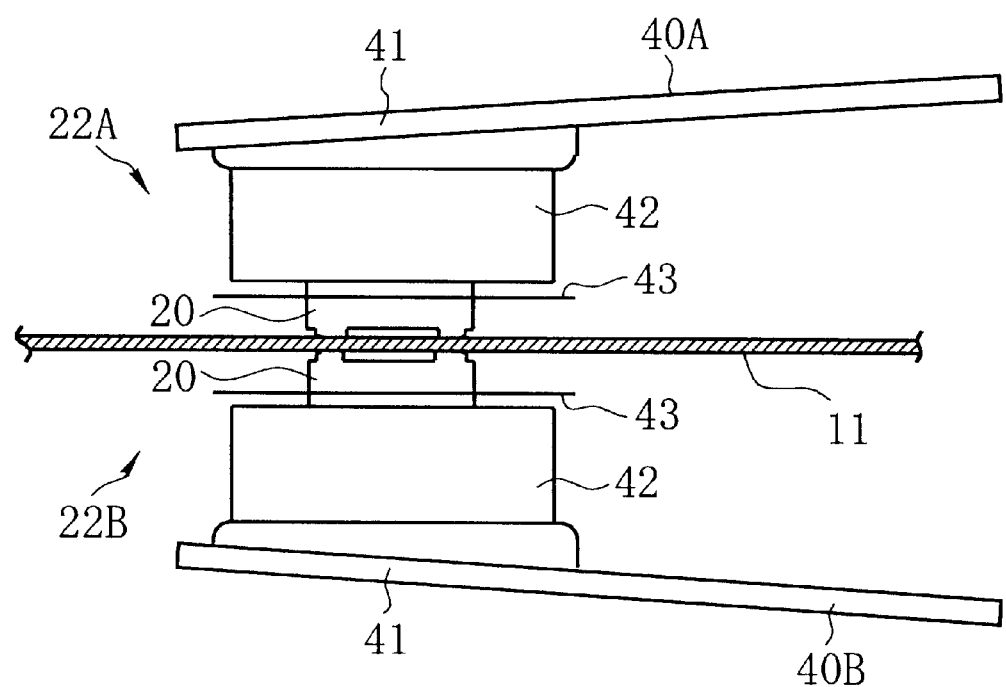
FIG. 7 is a view showing configurations of upper and lower head portions.

Support arms 40A and 40B respectively support the upper and lower head portions 22A and 22B (see FIG. 1). Configurations of the head portions 22A and 22B will be described in detail using FIGS. 7 through 22. As shown in FIG. 7, the head portions 22A and 22B comprise respectively spacer members 42, 42 placed over leading portions 41, 41 of the support arm 40A and 40B respectively, gimbals 43, 43 placed over the spacer members 42, 42 respectively, and the above-described magnetic head elements 20, 20 attached to the gimbals 43, 43 respectively.

Figure 8:
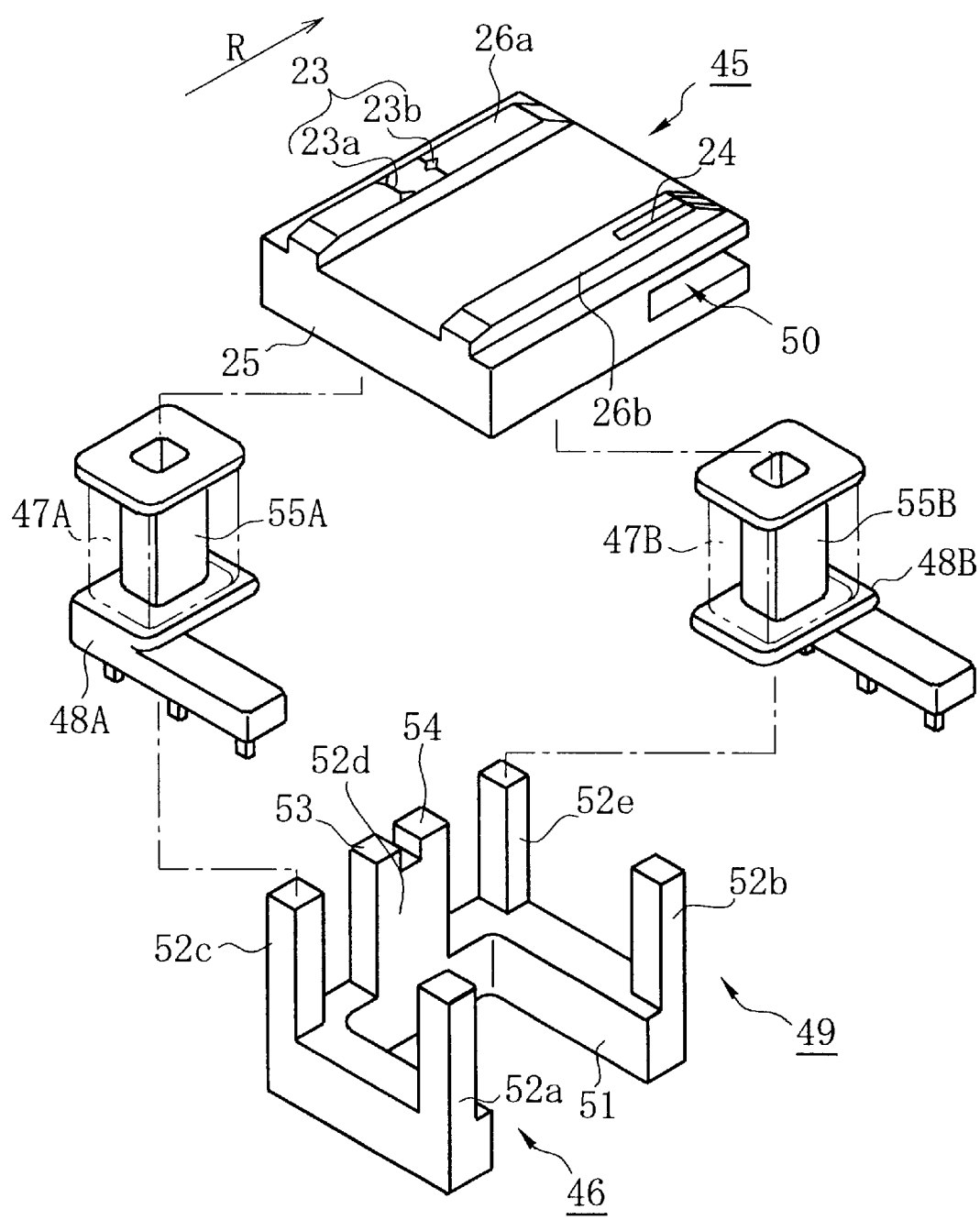
FIG. 8 is an exploded perspective view of a magnetic head element.
Figure 9:
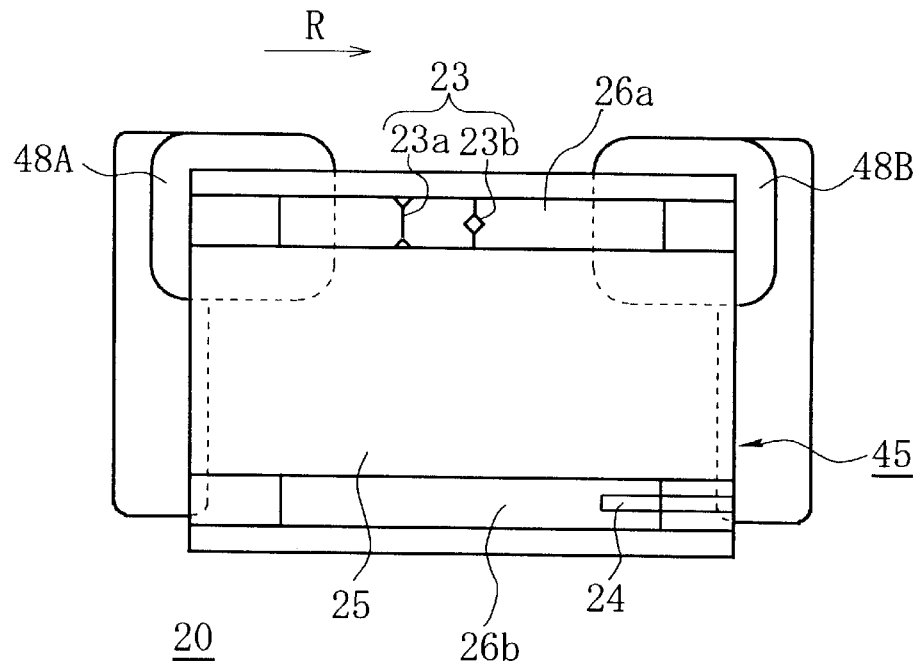
FIG. 9 is a plan view of the magnetic head element.

As shown in FIG. 8, the magnetic head element 20 has a head chip portion 45. As described above, the head chip portion 45 is constructed such that two rails 26a and 26b are projected from the bottom of the slider 25 so as to extend longitudinally in the same direction as the tangential direction R of the track of the disk and be parallel with each other. Further, the rail 26a incorporates the head chip 23 for a standard recording density (low-order mode) in the substantially central position thereof as viewed in the tangential direction R of the track, whereas the rail 26b incorporates the head chip 24 for a high recording density (high-order mode) in the rear side thereof with respect to the tangential direction R of the track (see FIG. 3A).

Further, the magnetic head element 20 includes a core forming member 46 provided on the surface side of the head chip portion 45, which is opposite to the surface opposed to the floppy disk 11 thereof and a core portion 49 having a first coil portion 48A for winding a coil 47A and a second coil portion 48B for winding a coil 47B, each of which is attached to the core forming member 46.

Figure 10:
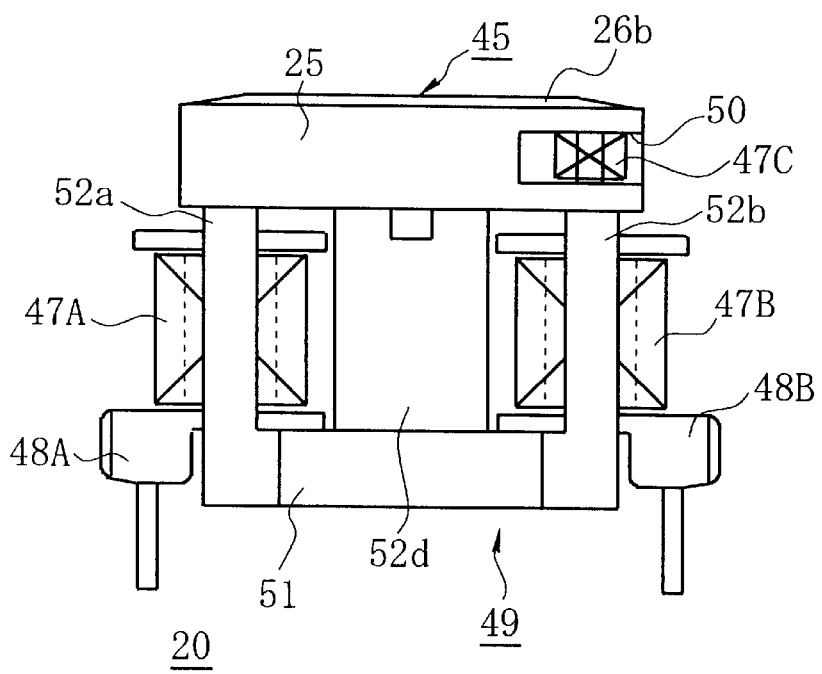
FIG. 10 is an elevational view of the magnetic head element.
Figure 11:
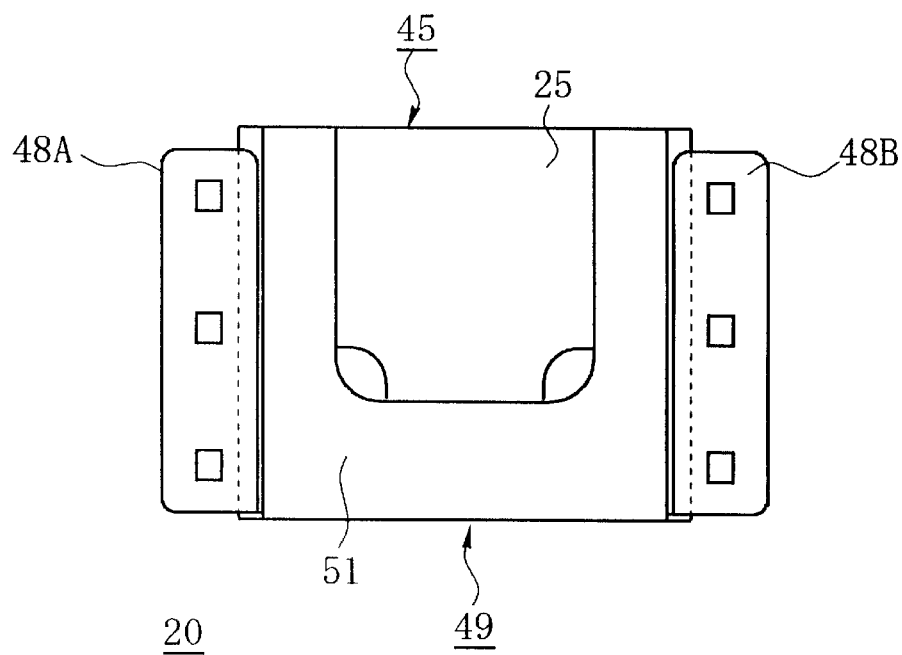
FIG. 11 is a bottom view of the magnetic head element.
Figure 12:
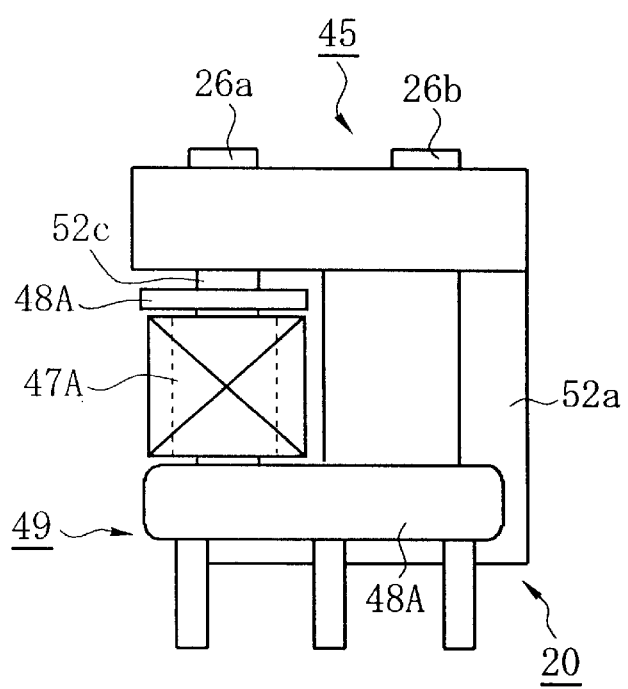
FIG. 12 is a side view of the magnetic head element.

A cut-away portion 50 for exposing a part of the head chip 24 outwards is defined in the slider 25 of the head chip portion 45. A part of a portion which serves as a magnetic core of the head chip 24, is exposed outwards within the cut-away portion 50 as shown in FIG. 10. A coil 47C for the head chip 24 is wound around this portion.

The core forming member 46 attached to the head chip portion 45 includes a base 51 comprised of a magnetic substance and formed in a substantially inverted U-shaped frame, Legs 52a and 52b comprised of a non-magnetic substance and provided upright upwardly on the base 51, and legs 52c, 52d and 52e comprised of the magnetic substance and provided upright upwardly on the base 51. Namely, the legs 52a and 52b are respectively provided vertically at the ends of the base 51. The legs 52c and 52e are respectively provided upright at the corners of the base 51. The leg 52d is provided upright between the leg 52c and the leg 52e. Further, the leg 52d has a groove defined in an upper end surface thereof on the head chip portion 45 side. Thus, the leg 52d has a first end surface 53 and a second end surface 54.

The first coil portion 48A attached to the core forming member 46 has the coil 47A and a first bobbin 55A on which the coil 47A is wound. The first bobbin 55A is L-shaped and has a cylindrical portion in which a pair of flanges is formed in its upward and downward directions. Further, the first bobbin 55A is formed so that the inner peripheral surface of the cylindrical portion is substantially identical in shape to the outer peripheral surface of the leg 52c.

On the other hand, the second coil portion 48B attached to the core forming member 46 includes the coil 47B and a second bobbin 55B on which the coil 47B is wound, in a manner similar to the first coil portion 48A. The second bobbin 55B is shaped in L-form and has a cylindrical portion in which a pair of flanges is formed in its upward and downward directions. Further, the second bobbin 55B is formed such that the inner peripheral surface of the cylindrical portion is substantially identical in shape to the outer peripheral surface of the leg 52e.

In the first coil portion 48A and second coil portion 48B, the cylindrical portions are respectively attached to the legs 52c and 52e in a state in which the coils 47A and 47B are wound around the first bobbin 55A and second bobbin 55B.

The core portion 49 abuts against the aforementioned head chip portion 45 in a state in which the first coil portion 48A and the second coil portion 48B have been attached to the core forming member 46 in this way. At this time, the legs 52a and 52b are brought into contact with the positions of the surface of slider 25 of the head chip portion 45, said surface being opposite to the surface provided with the rail 26. Said positions are positioned at the neighborhoods of the positions corresponding to the opposite ends on the rail 26b. The leg 52c has an upper surface brought into contact with a position corresponding to the recording-reproducing head 23a of the opposite surface of slider 25 so as to be magnetically connected thereto. Further, the leg 52e has an upper surface brought into contact with a position corresponding to the erase head 23b of the opposite surface of slider 25 so as to be magnetically connected thereto. Moreover, the leg 52d is brought into contact with a portion of the opposite surface of slider 25, said portion corresponding to the portion between the recording-reproducing head 23a and the erase head 23b. Thus, the leg 52d has the first end surface 53 magnetically connected to the recording-reproducing head 23 and the second end surface 54 magnetically connected to the erase head 23b.

By bringing the core portion 49 and the head chip portion 45 into contact with each other, the legs 52c and 52d constitute a magnetic core in the recording-reproducing head 23a. Namely, in the recording-reproducing head 23a, a magnetic path is formed between the leg 52c to which the first coil portion 48A is attached and the leg 52d whose first end surface 53 abuts against the slider 25. By bringing the core portion 49 and the head chip portion 45 into contact with each other, the leg 52e and the leg 52d constitute a magnetic core in the erase head 23b. Namely, in the erase head 23b, a magnetic path is formed between the leg 52e to which the second coil portion 48B is attached and the leg 52d whose second end surface 54 is brought into contact with the slider 25.

Figure 13:
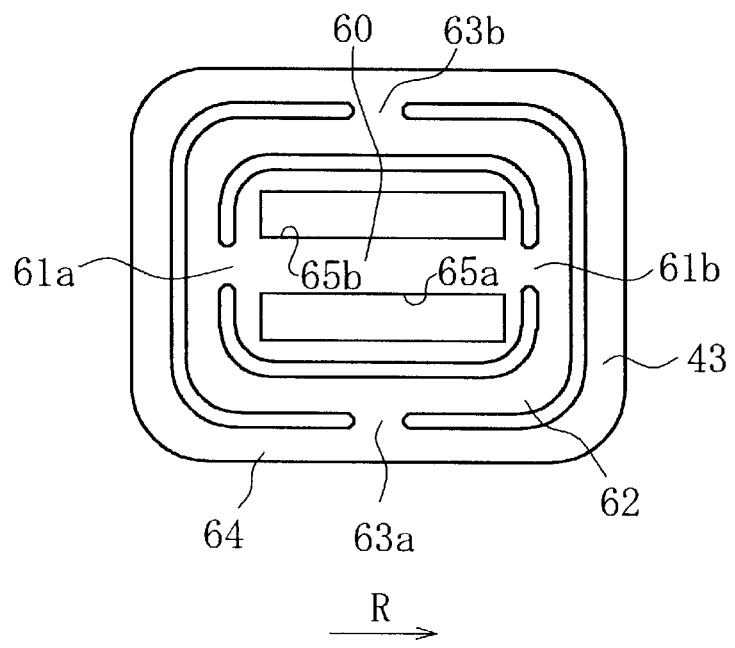
FIG. 13 is a plan view of a gimbal.
Figure 14:
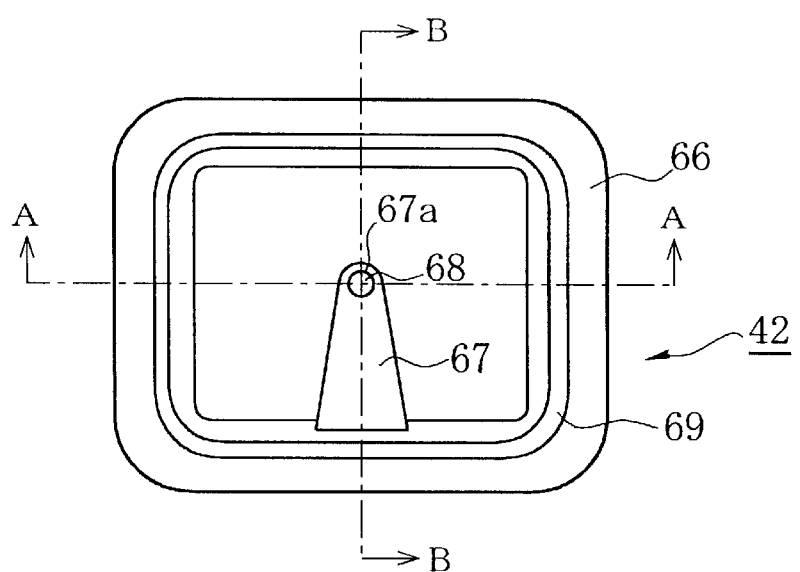
FIG. 14 is a plan view of a spacer member.
Figure 15:
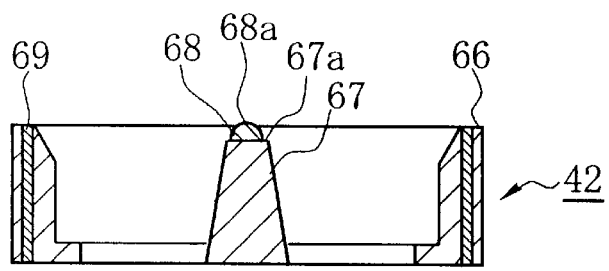
FIG. 15 is a cross-sectional view taken along the line A—A as shown in FIG. 14.
Figure 16:
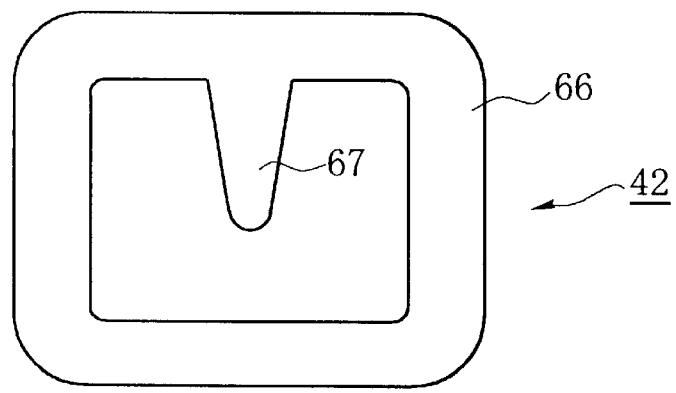
FIG. 16 is a bottom view of the spacer :member.
Figure 17:
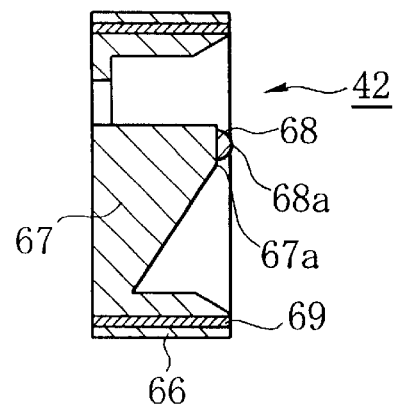
FIG. 17 is a cross-sectional view taken along the line B—B as shown in FIG. 14.
Figure 18:
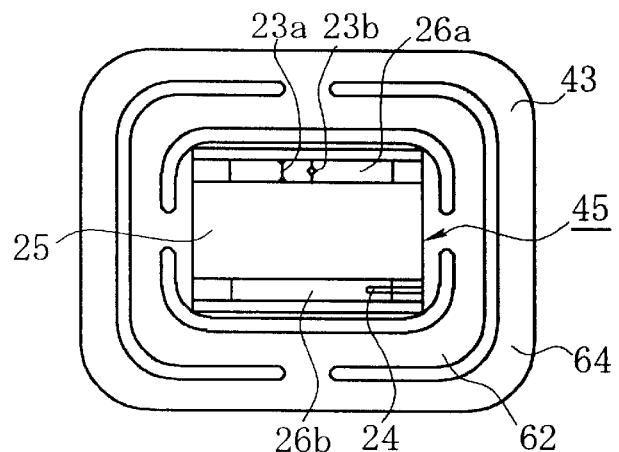
FIG. 18 is a plan view showing a state in which a magnetic head element, a gimbal and a spacer member are assembled.
Figure 19:
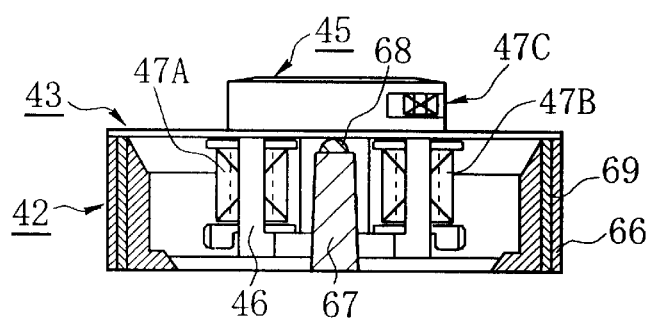
FIG. 19 is a partly cross-sectional view illustrating the state in which the magnetic head element, gimbal and spacer member are assembled.
Figure 20:
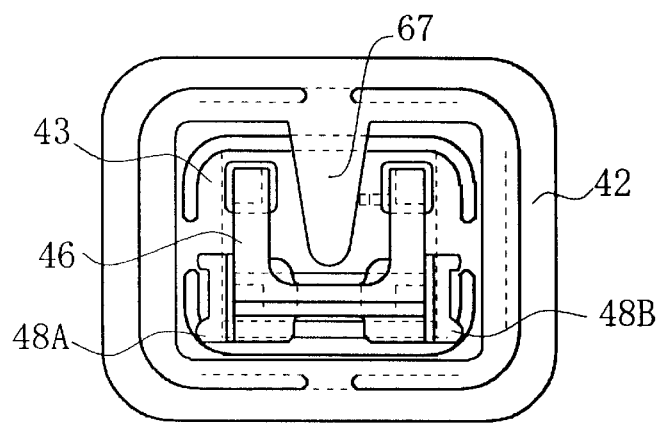
FIG. 20 is a bottom view depicting the state in which the magnetic head element, gimbal and spacer member are assembled.
Figure 21:
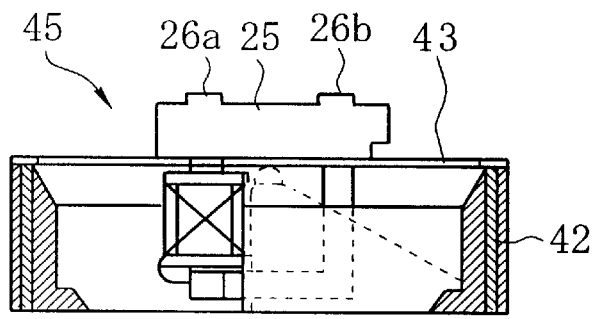
FIG. 21 is a partly sectional side view showing the state in which the magnetic head element, gimbal and spacer member are assembled.

As described above, each of the gimbals 43 attached to the magnetic head elements 20 is shaped like a substantially rectangular plate in overall configuration as shown in FIG. 13. The gimbal 43 comprises a head attachment portion 60 which places the aforementioned head chip portion 45 thereon, a first ring frame portion 62 coupled to the head attachment portion 60 through first coupling portions 61a and 61b so as to surround the outer periphery of the head attachment portion 60, and a second ring frame portion 64 coupled to the first ring frame portion 62 through second coupling portions 63a and 63b so as to surround the outer periphery of the first ring frame portion 62. Further, the gimbal 43 is constructed such that the direction in which the first coupling portions 61a and 61b are linked to each other and the direction in which the second coupling portions 63a and 63b are linked to each other, intersect each other. Now, the direction in which the first coupling portions 61a and 61b are linked, is held in parallel with the tangential direction (the direction of rotation of the disk) R of the track. Incidentally, the gimbal 43 is made of a stainless material, for example.

The head attachment portion 60 in the gimbal 43 is shaped so as to have an outside shape slightly greater than that of the aforementioned head chip portion 45. Further, the head attachment portion 60 has a pair of openings 65a and 65b spaced away from each other in the direction intersecting the tangential direction R of the track.

Each gimbal 43 constructed in this way is attached to the aforementioned magnetic head element 20. Described specifically, the gimbal 43 is set between the aforementioned head chip portion 45 and core portion 49. At this time, the head chip portion 45 is placed on one surface of the gimbal 43 so that the positions of the opposite surface of the slider 25 corresponding to the opposite ends of the rail 26b may be seen through the opening 65a and the position of the opposite surface of the slider 25 corresponding to the head chip 23 may be seen through the opening 65b. Further, the leg 52a and the leg 52b are brought into contact with the positions of the opposite surface of the slider 25 of the head chip portion 45, which are seen through the opening 65a, from the other surface side of the gimbal 43. The leg 52c, leg 52d and leg 52e are brought into contact with the position of the opposite surface of the slider 25 of the head chip portion 45 seen through the opening 65b as described above.

Thus, the opening 65a has the opening dimension enough to insert the leg 52a and the leg 52b therethrough. Further, the opening 65b also has the opening dimension enough to insert the leg 52c, leg 52d and leg 52e therethrough. Thus, the gimbals 43 are attached to a midcourse portion in the thickness directions of the head portions 22A and 22B.

The spacer member 42 attached to each gimbal 43 comprises a peripheral wall 66 shaped in a substantially ring form, a pivot placement portion 67 provided upright inside the peripheral wall 66, and a pivot 68 placed on the pivot placement portion 67, as shown in FIGS. 14 through 17.

The peripheral wall 66 is shaped in the form of a cylinder having an inside shape slightly greater than an outside shape of the above-described core portion 49 and an outside shape substantially identical to the outside shape of the above-described gimbal 43. Further, the peripheral wall 66 has a magnetic shield 69 provided thereinside. The magnetic shield 69 is comprised of, for example, a magnetic material having high permeability and has an outside shape slightly smaller than the peripheral wall 66.

The pivot placement portion 67 is formed so as to extend substantially toward the center from the internal surface of the peripheral wall 66 and be provided upright upwardly substantially from the center. The pivot placement portion 67 is formed so as to have a height slightly lower than that of the peripheral wall 66. The pivot placement portion 67 has the pivot 68 formed on its upper end surface 67a. The pivot 68 is shaped in the form of a substantially semi-sphere and is formed such that an upper end portion 68a thereof is positioned slightly above the height of the peripheral wall 66.

The spacer member 42 constructed in this way is formed by molding the peripheral wall 66, pivot placement portion 67 and pivot 68 in one piece. At this time, the spacer member 42 may preferably be insert-molded to place the magnetic shield 69 inside the peripheral wall 66.

As shown in FIGS. 18 through 21, the spacer member 42 is fixedly attached to the above-described gimbal 43. Namely, the spacer member 42 is attached to the surface of the gimbal 43 opposite to the attached surface of the head chip portion 45, i.e., the other surface of the gimbal 43. By attaching the other surface of the gimbal 43 to the spacer member 42, the pivot 68 presses a substantially central portion of the other surface of the gimbal 43 under predetermined pressure. Namely, the head attachment portion 60 of the gimbal 43 is supported by the pivot 68 from the other surface.

At this time, the core portion 49 positioned on the other surface side of the gimbal 43 is held inwardly of the peripheral wall 66. Incidentally, since the pivot placement portion 67 is located in an open portion of the base 51 of the core forming member 46, shaped in the form of the substantially inverted-shaped frame, it will not be an obstacle to the accommodation Df the core portion 49 inwardly of the peripheral wall 66.

Figure 22:
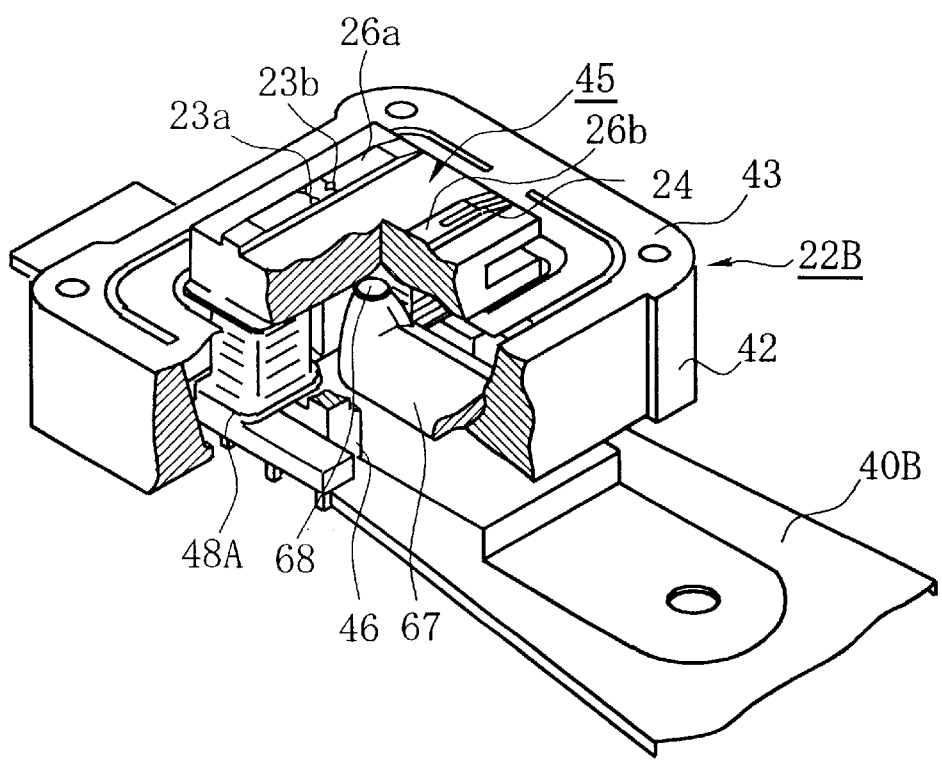
FIG. 22 is a partly sectional perspective view illustrating a state in which a head portion is attached to a support arm.

The head portions 22A and 22B formed by assembling the magnetic head elements 20, gimbals 43 and spacer members 42 as described above are attached to the support arms 40A and 40B respectively as described above. As shown in FIG. 22 (showing the head portion 22B side alone), the support arms 40A and 40B are respectively composed of a plate-like member having a predetermined length. One ends (not shown) of the support arms 40A and 40B are connected to a head carriage 70 (shown in FIG. 1). The spacer members 42, which constitute the above-described head portions 22A and 22B, are respectively attached to the other ends of the support arms 40A and 40B. Incidentally, at this time, the spacer members 42 are respectively attached to the support arms 40A and 40B so as to be opposed to each other.

Movements after and before recording and reproduction of data, of the magnetic head device 21 provided with the head portions 22A and 22B as described above will next be explained in brief.

Figure 23A:
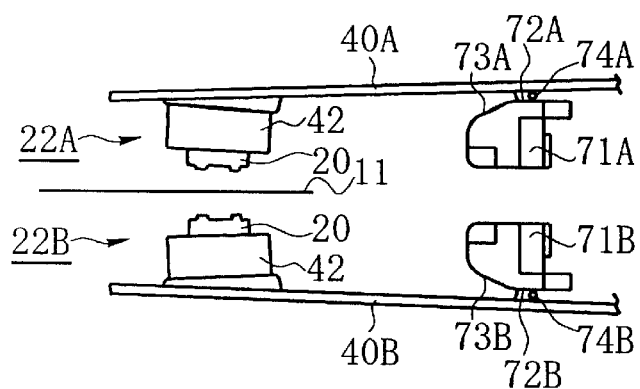
FIGS. 23A, 23B, 23C and 23D are views for describing operations after and before the recording and reproducing operations of a magnetic head device.

In an initial state, arm operating members 71A and 71B are spaced away from each other in upward and downward directions as shown in FIG. 23A. A lift pin abutment surface 72A of the upper arm operating member 71A abuts against a lift pin 74A attached to the support arm 40A so that the support arm 40A is held in an upwardly-flexed state. Further, a lift pin abutment surface 72B of the lower arm operating member 71B is brought into abutment against a lift pin 74B attached to the support arm 40B so that the support arm 40B is held in a downwardly-flexed state. Thus, the magnetic head elements 20, which constitute the head portions 22A and 22B respectively, are respectively placed in a state of being not brought into contact with the recording surfaces of the floppy disk 11 in this initial state.

Figure 23B:
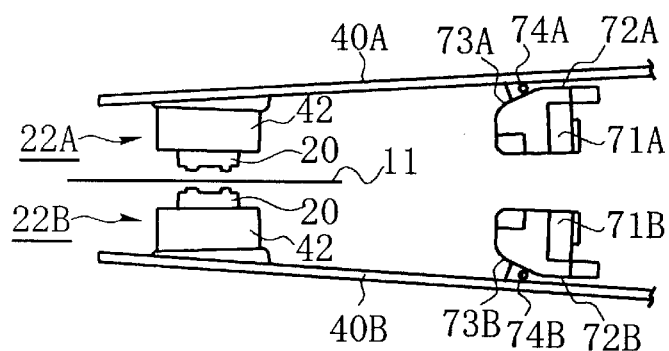

Next, a spindle motor to be described later is turned on to rotate the floppy disk 11. In this state, a current is caused to flow into a VCM (Voice Coil Motor) to be described later so as to slide the head carriage 70 to the inner peripheral side of the disk. In this case, the lift pin 74A of this support arm 40A moves down along an inclined surface 73A of the arm operating member 71A as shown in FIG. 23B, so that the magnetic head element 20 of the head portion 22A is shifted to a recording or reproduction position on the upper surface side of the disk 11. Similarly, the lift pin 74B of the support arm 40B moves upward along an inclined surface 73B of the arm operating member 71B so that the magnetic head element 20 of the head portion 22B is shifted to a recording or reproduction position on the lower surface side of the disk 11.

When the floppy disk 11 is given as the floppy disk 11B for the standard recording density (low-order mode) and is rotated at a low speed, the rails 26a and 26b of each magnetic head element 20 are brought into soft contact with the recording surface of the disk 11, i.e., they make a soft landing. Dn the other hand, when the floppy disk 11 is given as the floppy disk 11A for the high recording density (high-order mode) and is rotated at a high speed, the rails 26a and 26b of each magnetic head element 20 are respectively slightly levitated from the recording surface of the disk 11.

Figure 23C:
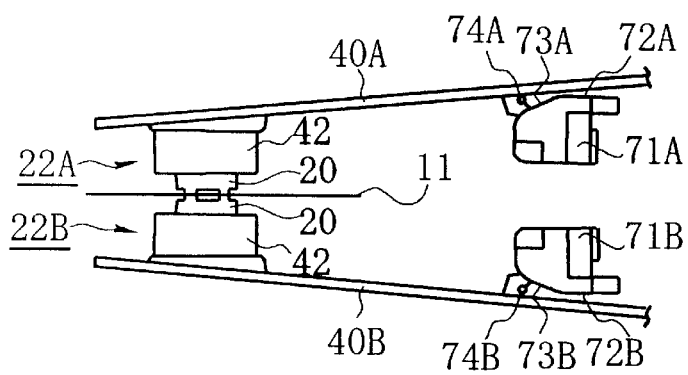
Figure 23D:
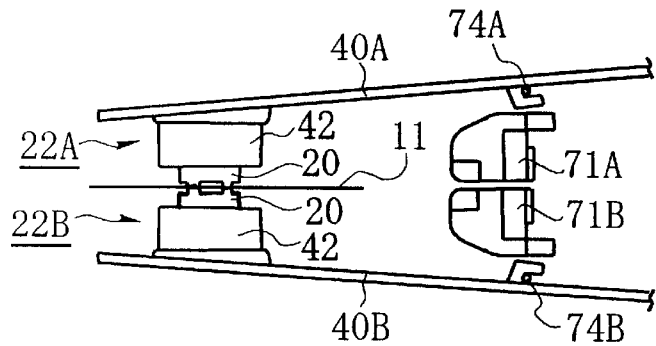

Next, as shown in FIG. 23D, the arm operating members 71A and 71B are superimposed on one another in upward and downward directions and kept in a closed state so as to be held in a state being in non-contact with the support arms 40A and 40B. In this state, the recording or reproduction is performed while the head carriage 70 is being moved in the radial direction of the floppy disk 11.

Next, when the recording or reproduction is completed, the head carriage 70 is fed to the outer peripheral side of the floppy disk 11 and the arm operating members 71A and 71B are spaced away from each other in the upward and downward directions. Thus, the magnetic head device 21 returns to the initial state shown in FIG. 23A, so that the magnetic head elements 20 constituting the head portions 22A and 22B respectively are placed in the state of being brought into non-contact with their corresponding recording surfaces of the disk 11.

Referring back to FIG. 1, the disk drive 10 has a DSP (digital signal processor) 101 used as a controller for performing control of the entire disk drive. The DSP 101 performs control of the rotation of the floppy disk 11, control of the movement of the magnetic head device 21, control of a recording-reproducing system for a high recording density (high-order mode), control of a recording-reproducing system for a standard recording density (low-order mode), etc. The DSP 101 is electrically connected to a bus 102. The DSP 101 fetches a program stored in a flash memory 103 connected to the bus 102 and executes control operations in accordance with the program.

The disk drive 10 also has a disk detector 104 for detecting by using the above-described notch 17 or the like whether the floppy disk 11 is either the floppy disk 11A for the high recording density (high-order mode) or the floppy disk 11B for the standard recording density (low-order mode). A signal outputted from the disk detector 104 is supplied to the DSP 101 as a mode signal SMD. The DSP 101 performs switching control of the rotational speed of the floppy disk 11, control of the switching between the recording-reproducing systems and control of the switching between interfaces, according to the mode signal SMD.

Further, the disk drive 10 has a spindle motor 105 for rotating the floppy disk 11, and a spindle motor driver 106 for driving the motor 105. A frequency signal SFG having a frequency corresponding to a rotational speed of the floppy disk 11, which is obtained from the motor 105, is supplied to the DSP 101 through the driver 106. The DSP 101 refers to the frequency signal SFG and thereby controls the driver 106 so that the rotational speed of the floppy disk 11 reaches a predetermined value.

Moreover, the disk drive 10 has a VCM 108 for moving the head carriage 70 connected with the support arms 40A and 40B for supporting the head portions 22A and 22B constituting the magnetic head device 21 in the radial direction of the disk, and a VCM driver 109 for driving the VCM 108. Based on tracking information or the like about the magnetic head device 21, which is outputted from a R/W channel IC 113 to be described later, the DSP 101 controls the VCM driver 109 so that the magnetic head device 21 is properly placed on a target track.

The disk drive 10 has the recording-reproducing system for the high recording density (high-order mode) and the recording-reproducing system for the standard recording density (low-order mode). The recording-reproducing system for the high recording density (high-order mode) has a disk controller 111 for swapping data, status and commands with the host computer, a DRAM (Dynamic random access memory) 112 used as a data buffer, the R/W channel IC 113 for performing a record-signal process and a reproduced-signal process, and an amplifier unit 114 having a recording amplifier for amplifying the record signal outputted from the R/W channel IC 113 and supplying it to the high-recording density (high-order mode) head chips 24 of the head portions 22A and 22B and a reproduction amplifier for amplifying a signal reproduced by the head chips 24 and supplying it to the R/W channel IC 113.

Figure 24:
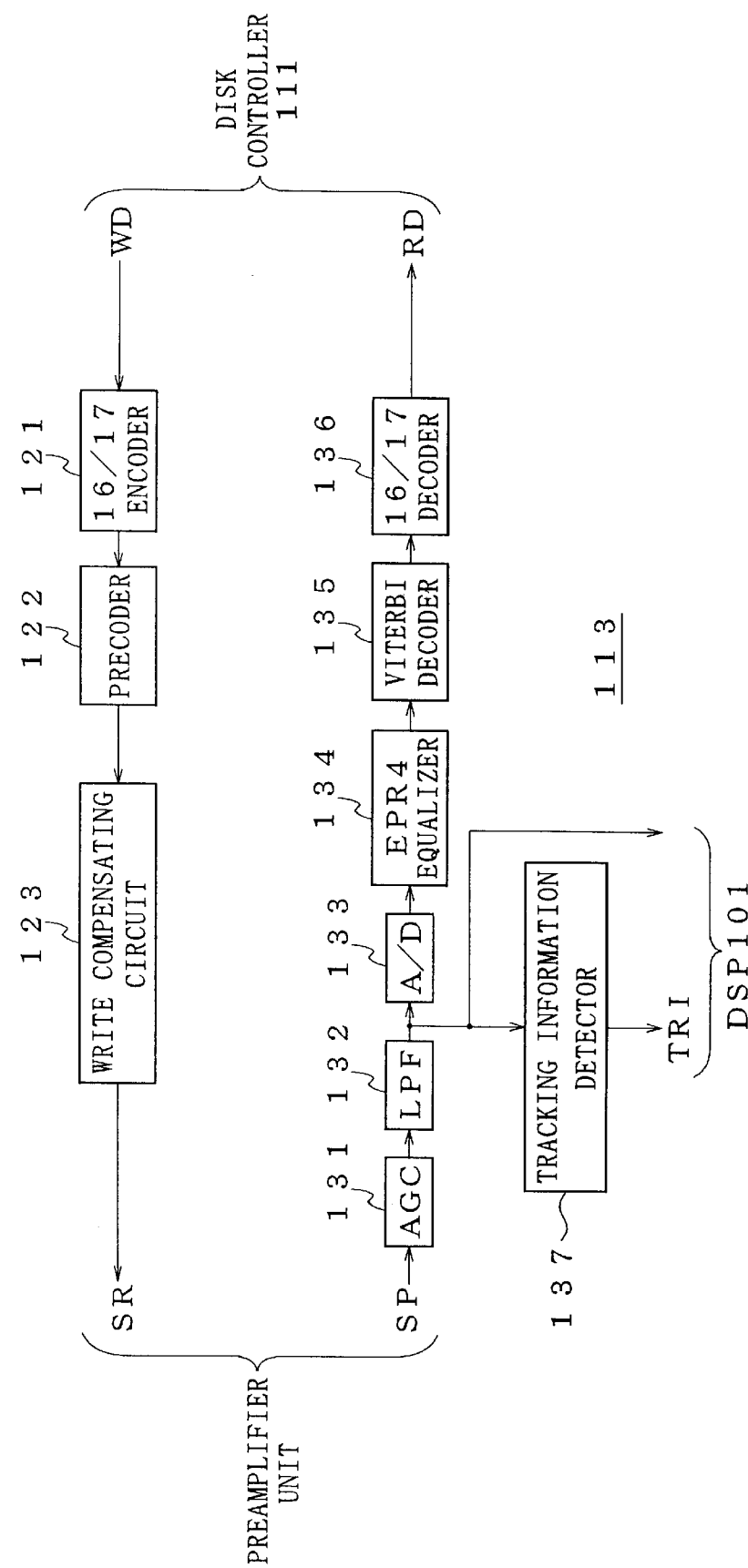
FIG. 24 is a block diagram showing a configuration of a R/W channel IC constituting a high-recording density high-order mode) recording-reproducing system of a floppy disk drive.

The disk controller 111 is electrically connected to the bus 102. The operation of the disk controller 111 and that of the R/W channel IC 113 are respectively controlled by the DSP 101. The disk controller 111 is connected to the host computer (not shown) through an EIDE (Extended Intelligent Drive Electronics) interface. FIG. 24 shows a constitution of the R/W channel IC 113.

As a recording system, this IC 113 has a 16/17 encoder 121 for performing an encoding process using 16/17 codes, which is defined as a digital modulating process, on write data WD supplied from the disk controller 111, a precoder 122 for giving partial response equalization and inverse-characterietic's interference to data (serial data) outputted from the encoder 121, and a write compensating circuit 123 for compensating for a phase shift produced in output data of the precoder 122 upon reproduction, in advance upon recording to thereby obtain a record signal SR.

As a reproducing system, the IC 113 also has an AGC (Automatic Gain Control) circuit 131 for holding constant the amplitude of the reproduction signal SP outputted from the amplifier unit 114, a low-pass filter 132 for eliminating unnecessary high-frequency components from a signal outputted from the AGC circuit 131, an A/D converter 133 for converting a signal outputted from the low-pass filter 132 to a digital signal, and an equalizer 134 for performing waveform equalization of an EPR4 (Extended Partial Response class 4) on data outputted from the A/D converter 133.

Further, the IC 113 has, as the reproducing system, a viterbi decoder 135 used as a data discriminator for performing a 0/1 data discriminating process on data outputted from the equalizer 134, and a 16/17 decoder 136 for performing a decoding process using 16/17 codes on data outputted from the viterbi decoder 135 to thereby obtain read data RD. Although not described above, the write data WD is obtained by adding an error correcting code thereto by the disk controller 111 and thereafter performing an interleave process thereon. The read data RD is also in a state similar to the write data WD. Thus, it is subjected to a de-interleave process and an error correcting process by the disk controller 111.

Moreover, the IC 113 has a tracking information detector 137 for detecting tracking information TRI from the signal outputted from the low-pass filter 132. The tracking information TRI is supplied to the DSP 101. Incidentally, the output signal of the low-pass filter 132 is directly supplied to the DSP 101 so that a track number or the like is detected. Further, the DSP 101 controls the VCM driver 109 based on the tracking information TRI and the detected information such as the track number or the like so that the magnetic head device 21 is placed on a target track.

Referring back again to FIG. 1, the disk drive 10 has an FDD controller 115 as the recording-reproducing system for the standard recording density (low-order mode). The FDD controller 115 is electrically connected to the host computer (not shown) through an FDD (Floppy Disk Drive) interface. The FDD controller 115 has some functions such as generating a record signal from MFM-modulated data transmitted from the host computer upon writing and supplying it to each of the recording-reproducing heads 23a of the head portions 22A and 22B, and obtaining MFM-modulated data from a reproduction signal outputted from the recording-reproducing head 23a upon reading and supplying it to the host computer.

The operation of the disk drive 10 shown in FIG. 1 will next be explained. The operation of the disk drive 10 when the floppy disk 11B for the standard recording density (low-order mode) is mounted thereto as the floppy disk 11, will be Described. In this case, the mode signal SMD supplied to the DSP 101 from the disk detector 104 indicates the low-order mode. Therefore, the DSP 101 controls the spindle motor driver 106 based on the frequency signal SFG outputted from the spindle motor 105 so that the floppy disk 11 is rotated at the standard speed (e.g., 300 rpm). Further, the recording-reproducing system for the standard recording density (low-order mode) is brought to a used state under the control of the DSP 101.

Upon writing (when the head portions 22A and 22B are held in the state shown in FIG. 23C) in such a state, MFM-modulated data used as write data are supplied to the FDD controller 115 from the host computer through the FDD interface. A record signal corresponding to the MFM-modulated data is outputted from the FDD controller 115 and supplied to the recording-reproducing heads 23a of the head portions 22A and 22B, where it is recorded on a predetermined sector on a target track of the floppy disk 11. Upon reading on the other hand, a signal reproduced by each recording-reproducing head 23a from the predetermined sector on the target track of the floppy disk 11 is supplied to the FDD controller 115, MFM-modulated data corresponding to the reproduction signal is outputted from the FDD controller 115 and the MFM-modulated data are supplied to the host computer.

The operation of the disk drive 10 when the floppy disk 11A for the high recording density (high-order mode) is mounted there to as the floppy disk 11, will be described. In this case, the mode signal SMD supplied to the DSP 101 from the disk detector 104 indicates the high-order mode. Therefore, the DSP 101 controls the spindle motor driver 106 based on the frequency signal SFG outputted from the spindle motor 105 so that the floppy disk 11 is rotated at the high speed (e.g., 3600 rpm). Further, the recording-reproducing system for the high recording density (high-order mode) is brought to a used state under the control of the DSP 101.

Upon writing (when the head portions 22A and 22B are held in the state shown in FIG. 23C) in such a state, writing data are supplied to the disk controller 111 from the host computer through the use of the EIDE interface. This writing data are temporarily stored in the DRAM 112. The disk controller 111 performs an error correcting code adding process and an interleave process on the writing data to produce write data WD.

When signal is recorded on the predetermined sector on the target track of the floppy disk 11, the write data WD is supplied from the disk controller 41 to the R/W channel IC 113. A record signal SR corresponding to the write data WD is outputted from the R/W channel IC 113 and supplied to the head chips 24 of the head portions 22A and 22B through the recording amplifier of the amplifier unit 114, whereby it is recorded on the predetermined sector on the target track of the floppy disk 11.

Upon reading on the other hand, a signal reproduced by each head chip 24 from the predetermined sector on the target track of the floppy disk 11 is amplified by the reproduction amplifier of the amplifier unit 114, followed by supply to the R/W channel IC 113. The R/W channel IC 113 performs a waveform equalizing process, a data discriminating process, a 16/17-codes decoding process, etc. on the signal to obtain read data RD. The read data RD is supplied to the disk controller 111 where a de-interleave process and an error correcting process are effected thereon to obtain final read data. The resultant read data are temporarily stored in the DRAM 112 and thereafter supplied to the host computer.

In the present embodiments as described above, when the disk for the standard recording density (low-order mode) is placed as the floppy disk 11, the recording-reproducing heads 23a of the head portions 22A and 22B perform recording/reproduction in a state of being kept in contact with their corresponding recording surfaces of the disk. On the other hand, when the disk for the high recording density (high-order mode) is placed as the floppy disk 11, the head chips of the head portions 22A and 22B perform recording/reproduction in a state of being levitated from their corresponding recording surfaces of the disk. Thus, the recording/reproduction can be performed even on the disk for the standard recording density as well as on the disk for the high recording density, whereby low-order compatibility is provided.

Figure 25:
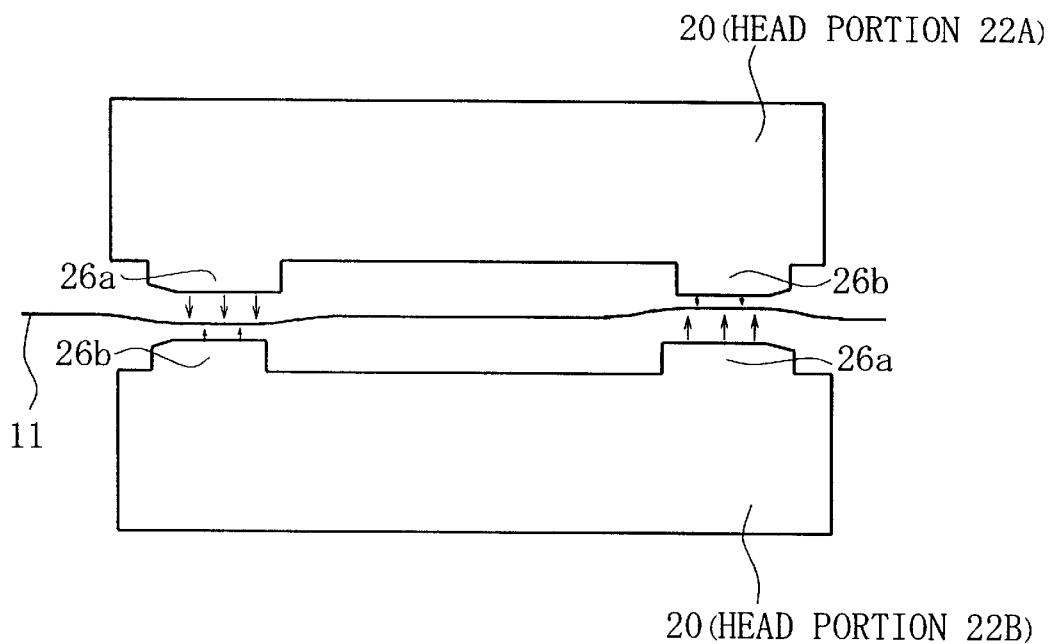
FIG. 25 is a view illustrating a deformed state of a floppy disk (for a high recording density) at recording/reproduction.
Figure 26:
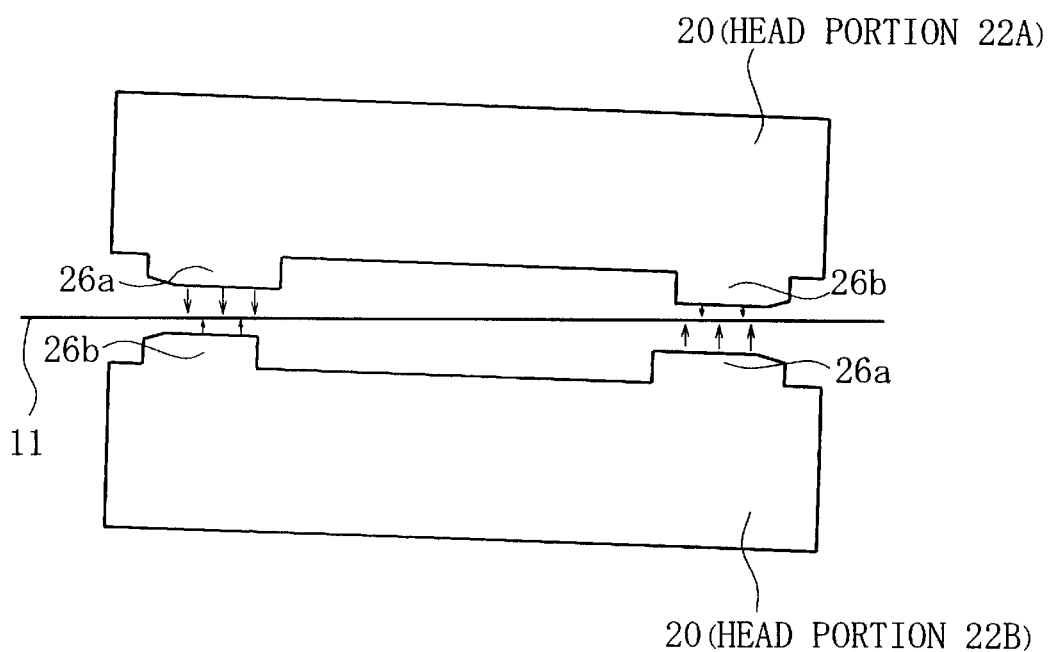
FIG. 26 is a view depicting inclined states of high-recording density magnetic head elements at recording/reproduction.

Each of the magnetic head elements 20 constituting the head portions 22A and 22B is equivalent to one wherein the rails 26a and 26b are formed in protruded form on the disk side at the bottom of the slider 25 so as to extend in the tangential direction R of the track of recording medium and be parallel with each other. Further, the magnetic head element 20 is one in which the width of the rail 26b is narrower than that of the rail 26a, the recording-reproducing head 23a is provided in the central position of the rail 26a, and the head chip 24 is provided on the rear side of the rail 26b. Therefore, when recording/reproduction is performed on the disk 11 for the high recording density, the amount of levitation of the rail 26b from the disk surface can be restrained as compared with the rail 26a. Further, the rails 26a and 26b of the magnetic head element 20 constituting the head portion 22A are placed so as to be opposed to the rails 25b and 26a of the magnetic head element 20 constituting the head portion 22B (see FIG. 5). When the recording/reproduction is performed on the disk 11 for the high recording density, the disk 11 is deformed so as to be pressed against the rail 26b narrow in width at the opposed rail portions (see FIG. 25). Alternatively, the rail 26b is inclined so as to further approach the recording surface of the disk 11 at the opposed rail portions (see FIG. 26), whereby the amount of levitation of the rail 26b from the disk surface is further reduced. Thus, the interval between the recording surface of the disk and each head chip 24 can be made narrower so that a recording/reproduction characteristic of each head chip 24 can be improved.

Since the outer edges 30a and 30b (see FIGS. 3A and 3B) of the rails 26a and 26b are processed into tapered form, the edges of the rails 26a and 26b make it possible to lessen the scratching of the recording surface of the disk 11 upon soft landing at the start of the above-described recording/reproduction and seek operation during the recording/reproduction.

In the aforementioned embodiments, the present invention is applied to the floppy disk drive 10. It is however needless to say that the present invention can be applied even to another magnetic disk drive in the same manner as described above.

According to the present invention, first and second rails are formed in protruded form on the slider of each magnetic head element so as to extend in the tangential direction of a track of recording medium and be parallel with each other. The first rail is provided with a head chip for a standard recording density, whereas the second rail is provided with a head chip for a high recording density. Further, the width of the second rail is narrower than that of the first rail. Thus, recording/reproduction can be performed even on the recording medium for a standard recording density as well as on the recording medium for a high recording density, whereby low-order compatibility is provided. Since the slider is inclined and levitated so that the second rail approaches the surface of the recording medium upon performing the recording/reproduction on the recording medium for the high recording density, the distance between the head chip for the high recording density and the recording surface of the recording medium can be reduced so that a recording-reproducing characteristic of the head chip for the high recording density can be improved.

Further, according to the present invention, first and second head portions placed in an opposing relationship so as to interpose the recording medium therebetween, are provided. First and second rails are formed in protruded form on the slider of the magnetic head element constituting each of the first and second head portions so as to extend in the tangential direction of a track of the recording medium and be parallel with each other. The second rail is provided with a head chip. Further, the width of the second rail is narrower than that of the first rail, and the first and second rails of the magnetic head element constituting the first head portion are respectively provided so as to be opposed to the second and first rails of the magnetic head element constituting the second head portion. Thus, when recording or reproduction is performed, the sliders of the first and second head portions are levitated so that the second rails approach their corresponding recording surfaces of the recording medium. Further, the recording medium is deformed or the magnetic head element is inclined so that each second rail approaches the recording surface of the recording medium at the opposite rail portions. Therefore, the interval between the recording surface of the recording medium and each head chip can be made smaller and hence a recording-reproducing characteristic of the head chip can be greatly improved.

While the above is a complete description of the preferred embodiments of the invention, various alternatives, modifications and equivalents may be used. Therefore, the above description should not be taken as limiting the scope of the invention as defined by the appended claims.

What is claimed is:

1. A magnetic head device comprising a magnetic head element including:
   a slider;
   first and second rails provided on the slider, the first and second rails protruding toward a recording medium, extending in a tangential direction of a track of the recording medium and parallel with each other;
   a first head chip for recording and reproducing data in a state of being kept in contact with a recording surface of the recording medium and in a first recording density, said first head chip being provided substantially in the central position of the first rail as viewed in the tangential direction of the track; and
   a second head chip for recording and reproducing data in a state of being levitated from the recording surface of the recording medium and in a second recording density greater than the first recording density, said second head chip being provided in a position on the rear side of the second rail with respect to the tangential direction of the track;
   wherein the width of the second rail of the magnetic head element is narrower than that of the first rail thereof.

2. The magnetic head device according to claim 1, wherein outer edges of the first and second rails of said magnetic head element are respectively tapered.

3. The magnetic head device according to claim 1, wherein a surface of the slider is a rectangle having a length of about 3 mm and a width of about 2.1 mm, said surface being opposite to the recording medium.

4. The magnetic head device according to claim 1, wherein a width of said first rail is about 0.42 mm and a width of said second rail is about 0.37 mm.

5. A magnetic head device comprising:
   first and second head portions disposed in an opposing relationship so as to interpose a recording medium therebetween, a magnetic head element, which constitutes each of the first and second head portions, including;
   a slider;
   first and second rails provided on the slider, the first and second rails protruding toward the recording medium, extending in a tangential direction of a track of the recording medium and parallel with each other; and
   a head chip for recording and reproducing data in a state of being levitated from a recording surface of the recording medium and in a predetermined density, said head chip being provided in a position on the rear side of the second rail with respect to the tangential direction of the track;
   wherein the width of the second rail is narrower than that of the first rail such that the slider is levitated to an inclined state with an interval between the second rail and the recording medium being less than an interval between the first rail and the recording medium;
   wherein the first and second rails of the magnetic head element constituting the first head portion are opposite to the second and first rails of the magnetic head element constituting the second head portion; and
   wherein a head chip for recording and reproducing data in a state of being kept in contact with the recording surface of the recording medium and in a density lower than the predetermined density is provided substantially in the central position of the first rail of each of said magnetic head elements constituting the first and second head portions as viewed in the tangential direction of the track.

6. The magnetic head device according to claim 5, wherein outer edges of the first and second rails of said magnetic head elements constituting said first and second head portions respectively are tapered.

7. The magnetic head device according to claim 6, wherein each of the centers of the widths excluding the outer edges, as viewed from a radial direction of the recording medium, of the first and second rails of said magnetic head element constituting said first head portion substantially coincide with each of the centers of the widths excluding the outer edges, as viewed from the radial direction of the recording medium, of the second and first rails of said magnetic head element constituting said second head portion.

8. The magnetic head device according to claim 5, wherein a surface of the slider is a rectangle having a length of about 3 mm and a width of about 2.1 mm, said surface being opposite to the recording medium.

9. The magnetic head device according to claim 5, wherein a width of said first rail is about 0.42 mm and a width of said second rail is about 0.37 mm.

10. A magnetic head device comprising:

first and second head portions disposed in an opposing relationship so as to interpose a recording medium therebetween, a magnetic head element, which constitutes each of the first and second head portions, including;

a slider;

first and second rails provided on the slider, the first and second rails protruding toward the recording medium, extending in a tangential direction of a track of the recording medium and parallel with each other;

a first head chip for recording and reproducing data in a state of being kept in contact with a recording surface of the recording medium and in a first recording density, said first head chip being provided substantially in the central position of the first rail as viewed in the tangential direction of the track;

a second head chip for recording and reproducing data in a state of being levitated from a recording surface of the recording medium, said head chip being provided in a position on the rear side of the second rail with respect to the tangential direction of the track;

wherein the width of the second rail is narrower than that of the first rail;

wherein the first and second rails of the magnetic head element constituting the first head portion are opposite to the second and first rails of the magnetic head element constituting the second head portion; and wherein each of the centers of the widths, as viewed from a radial direction of the recording medium, of the first and second head chips provided respectively on the first and second rails of said magnetic head element constituting said first head portion is coincide with each of the centers of widths, as viewed from the radial direction of the recording medium, of the second and first head chips provided respectively on the second and first rails of said magnetic head element constituting said second head portion.

11. A recording medium drive comprising:

a magnetic head device having a magnetic: head element including;

a slider;

first and second rails provided on the slider, the first and second rails protruding toward a recording medium, extending in a tangential direction of a track of the recording medium and parallel with each other;

a first head chip for recording and reproducing data in a state of being held in contact with a recording surface of the recording medium and in a first recording density, said first head chip being provided substantially in the central position of said first rail as viewed in the tangential direction of the track; and a second head chip for recording and reproducing data in a state of being levitated from the recording surface of the recording medium and in a second recording density greater than the first recording density, said second head chip being provided in a position on the rear side of said second rail with respect to the tangential direction of the track;

wherein said second rail of each of said magnetic head element has a width narrower than that of said first rail;

a record processing circuit for generating record data to be recorded on the recording medium by said magnetic head device; and a reproduction processing circuit for processing reproduction data reproduced from the recording medium by said magnetic head device.

12. The recording medium drive according to claim 11, wherein outer edges of the first and second rails of said magnetic head element are respectively tapered.

13. The recording medium drive according to claim 11, wherein a surface of the slider is a rectangle having a length of about 3 mm and a width of about 2.1 mm, said surface being opposite to the recording medium.

14. The recording medium drive according to claim 11, wherein a width of said first rail is about 0.42 mm and a width of said second rail is about 0.37 mm.

* * * * *